(12) United States Patent
Salas et al.

(10) Patent No.: US 6,314,408 B1
(45) Date of Patent: Nov. 6, 2001

(54) METHOD AND APPARATUS FOR CONTROLLING ACCESS TO A PRODUCT

(75) Inventors: Pito Salas, Arlington; Jeffrey Beir, Winchester; Melissa Leffler, Concord; McDonald Glenn; Paul Kleppner, both of Cambridge; Craig Morrissey, Wellesley; James E. Tonra, Jr., Wilmington, all of MA (US)

(73) Assignee: eRoom Technology, Inc., Cambridge, MA (US)

( * ) Notice: Subject to any disclaimer, the term of this patent is extended or adjusted under 35 U.S.C. 154(b) by 0 days.

(21) Appl. No.: 09/116,558

(22) Filed: Jul. 15, 1998

Related U.S. Application Data

(63) Continuation-in-part of application No. 08/893,111, filed on Jul. 15, 1997.

(51) Int. Cl.[7] .................................................. G06F 17/60
(52) U.S. Cl. .............................................................. 705/54
(58) Field of Search .............................. 705/54; 713/165, 713/200, 201, 202

(56) References Cited

U.S. PATENT DOCUMENTS

| | | | |
|---|---|---|---|
| 5,014,234 | * 5/1991 | Edwards et al. | 705/400 |
| 5,220,657 | 6/1993 | Bly et al. | 711/152 |
| 5,233,687 | 8/1993 | Henderson, Jr. et al. | 345/346 |
| 5,379,374 | 1/1995 | Ishizaki et al. | 345/331 |
| 5,390,297 | 2/1995 | Barber et al. | 713/201 |
| 5,392,400 | 2/1995 | Berkowitz et al. | 709/203 |
| 5,457,797 | 10/1995 | Butterworth et al. | 709/320 |
| 5,533,183 | 7/1996 | Henderson, Jr. et al. | 345/344 |
| 5,671,412 | 9/1997 | Christiano | 707/104 |
| 5,678,042 | 10/1997 | Pisello et al. | 714/47 |
| 5,687,317 | 11/1997 | Hughes et al. | 709/205 |
| 5,724,508 | 3/1998 | Harple, Jr. et al. | 709/205 |
| 5,781,727 | 7/1998 | Carleton et al. | 709/205 |
| 5,793,365 | 8/1998 | Tang et al. | 345/329 |
| 5,801,700 | 9/1998 | Ferguson | 345/349 |
| 5,826,025 | 10/1998 | Gramlich | 709/217 |
| 5,829,001 | 10/1998 | Li et al. | 707/10 |
| 5,862,330 | 1/1999 | Anupam et al. | 709/204 |
| 5,862,346 | 1/1999 | Kley et al. | 709/245 |
| 5,918,010 | 1/1999 | Appleman et al. | 709/203 |
| 5,923,845 | 7/1999 | Kamiya et al. | 709/206 |
| 6,026,433 | 2/2000 | D'Arlach et al. | 709/217 |
| 6,061,695 | 5/2000 | Slivka et al. | 707/513 |
| 6,088,451 | * 7/2000 | He et al. | 380/25 |
| 6,088,702 | 7/2000 | Plantz et al. | 707/103 |

FOREIGN PATENT DOCUMENTS

WO 98/58306 * 12/1998 (WO).

OTHER PUBLICATIONS no author; SmartSoft Upgrade Sales; Nov. 1, 1995; Internet web page copy; pp. 1,2.* no author; SmartSoft Product Sales; Jan. 3, 1996; Internet web page copy; pp. 1,2.*

* cited by examiner

*Primary Examiner*—James P. Trammell
*Assistant Examiner*—Thomas A. Dixon
(74) *Attorney, Agent, or Firm*—Testa, Hurwitz & Thibeault, LLP.

(57) ABSTRACT

A method for controlling access to a product includes receiving a request for a product, generating a license string for the product, and transmitting that license string to a user of the product. The license string is generated substantially at the time a request is received. A corresponding system is also described. In some embodiments the product functions for a trial period before requiring input of the license string. License strings may be generated that extend the trial period.

20 Claims, 13 Drawing Sheets eRoom: Create

1202 — Enter the question you want people to vote on.

Times New Roman | 10 | B | I | U | A:
1204  1206 1208 1210  1212 1214 1216 1200

1220 — Are we ready to make a decision on the name? Please enter your vote.

Enter the choices people can pick from (up to eight, one per line).

Yes
No
Try Later

1222 — ☐ Allow write-in votes
1224 — ☐ Allow multiple votes
1226 — ☑ Show each person's vote Help | Finish | Cancel
        1250    1252

FIG. 12

METHOD AND APPARATUS FOR CONTROLLING ACCESS TO A PRODUCT

CROSS-REFERENCE TO RELATED APPLICATIONS

This application claims priority to copending U.S. patent application Ser. No. 08/893,111, filed Jul. 15, 1997.

FIELD OF THE INVENTION

The present invention relates to networked systems and, more particularly, to electronic distribution of products.

BACKGROUND OF THE INVENTION

The world wide network of computers commonly known as the "Internet" has grown rapidly over the last several years. Much of this growth has been driven by the increase in popularity of the World Wide Web ("WWW" or "Web"). The WWW is a collection of files written using HyperText Markup Language (HTML), commonly referred to as "Web pages." HTML files may be easily configured and created by users and accessed and displayed using specialized applications known as Web browsers, which allow a user to access and view HTML files using a graphical user interface.

Partially as a result of this growth in popularity, many products can now be distributed to consumers with relative ease. Unfortunately, many users will not purchase a product without first trying the product. However, it is currently difficult to subsequently control access to a distributed product.

SUMMARY OF THE INVENTION

The present invention relates to systems and methods for controlling access to a product that has been distributed. In particular, the systems and methods described below allow a product to be distributed to a user for demonstration purposes without losing control of usage of the product. The systems and methods described below also allow multiple users access to a product for demonstration purposes while requiring only a single authorization to grant access to all users.

In one aspect, the present invention relates to a method for controlling access to a product. A request is received for a product. A license string that controls access to the product is generated substantially at the time the request is received. The generated license string is transmitted to the requestor. The requestor may enter the license string into the product in order to gain access to it.

In another aspect, the present invention relates to a system for controlling access to a product. The system includes an input unit which receives a request for a product. The system also includes a license string generator in electrical communication with the input unit. The license string generator produces a license string that controls access to the product. The license string is generated substantially at the time a request is received. The system also includes an output unit for transmitting the generated license string to the requestor.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

FIG. 12 is a screen shot of one embodiment of a dialog box presented to a user to create a vote/poll item.

DETAILED DESCRIPTION OF THE INVENTION

Figure 1:
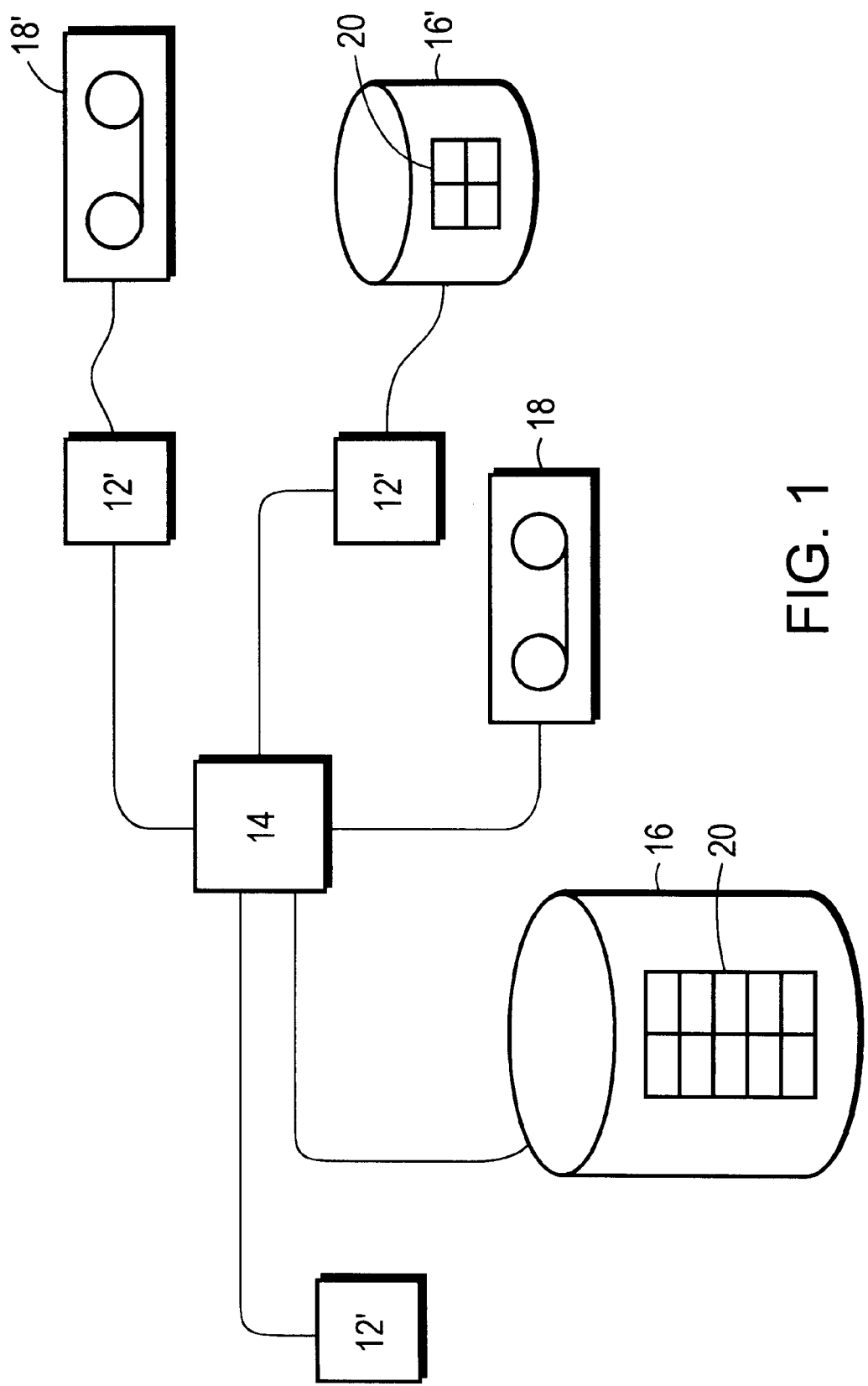
FIG. 1 is a block diagram of a system for providing a collaborative work environment.

Referring now to FIG. 1, and in brief overview, a system for providing a collaborative work environment via a network is shown. Client workstations 12' are connected to one or more servers 14. The client workstations 12' may be connected in any physical arrangement such as a star, loop, ring, or bus. The network connecting client workstations 12' and the server 14 may use any physical media, including wireless, provided that the physical media supports the HyperText Transfer Protocol (HTTP).

Figure 2:
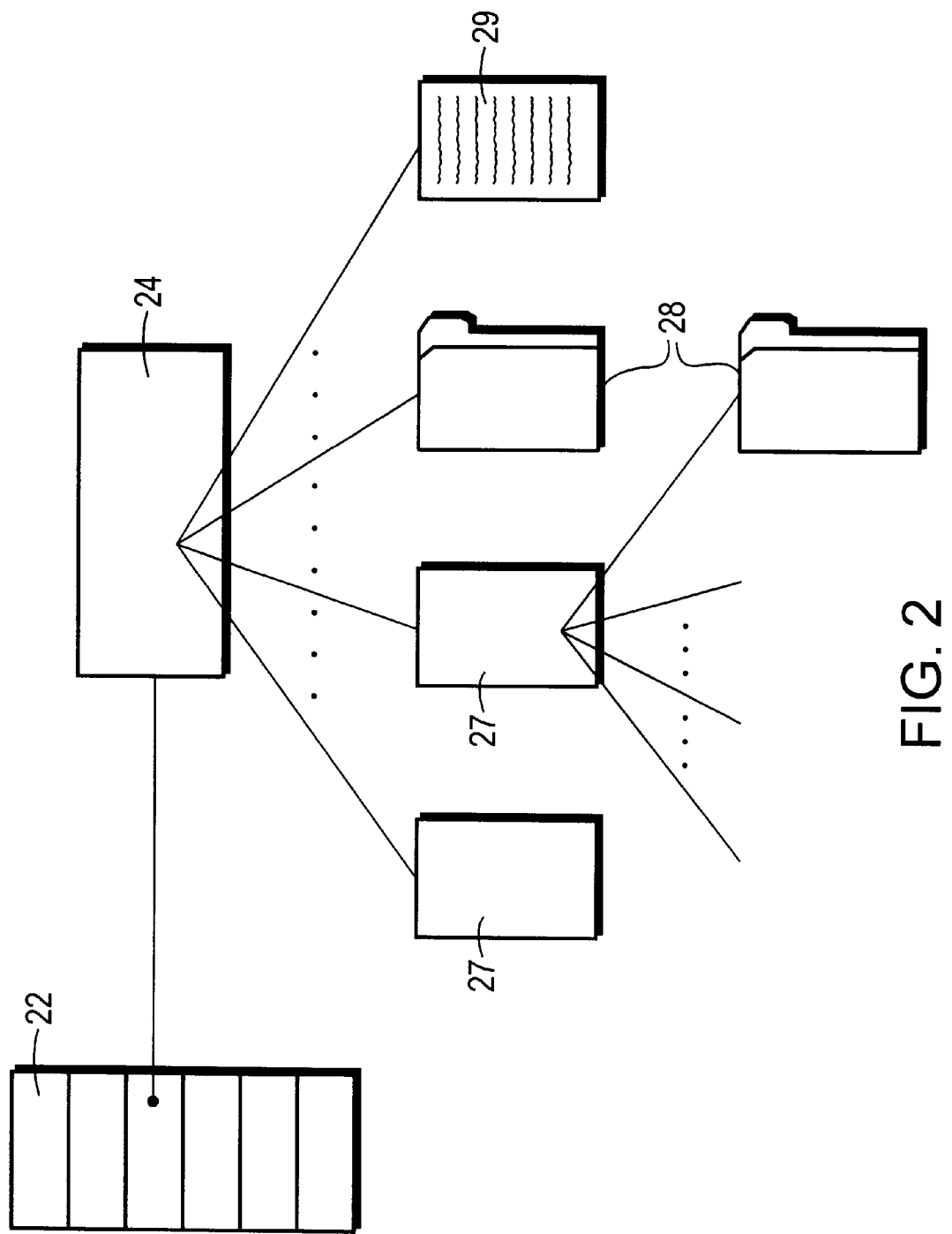
FIG. 2 is a diagrammatic view of a facility as stored by a server database.

The server 14 stores information relating to a project or a set of projects, referred to as a facility, in a database 20 which may be a flat database, relational database, multi-dimensional database, or object-oriented database. Each server 14 may store more than one database 20, where each database 20 represents a different facility. For example, one server may host project facilities for separate research efforts within one organization or for separate research efforts by separate organizations. Each facility is viewed by a user as a directory of eRoom pages. Referring now to FIG. 2, a directory of eRooms 22 as stored in the server database 20 is shown. Each entry provides at least one link to an eRoom front page 26, which in turn may contain other eRoom pages 27, folders containing database objects 28 or files 29.

Databases 20 may be stored by the server 14 on any convenient mass storage device. For example, FIG. 1 depicts an embodiment in which the server 14 stores the database 20 on an associated hard disk drive 16. Alternatively, the server 14 may store the database in Random Access Memory (RAM) if the database 20 is capable of fitting within the physical memory space of the server 14. The server 14 responds to requests for portions of the database 20 made by the client workstations 12' and transfers the requested data objects over the network to the requesting client workstation 12'.

The server database 20 stores various tables which contain information about eRooms, members, access controls, and other data objects. For example, a members table may be provided which includes unique identification codes for each user, a table value indicating for which eRooms the user fulfills a coordinator role, a table value which indicates for which eRooms the member fulfills an observer role, and a value describing the last time the member record was modified. Similarly, an eRooms table may be provided which includes a globally unique handle identifying the eRoom and one or more room flags which indicate various room attributes, such as whether a coordinator can create an eRoom, or whether the eRoom is a temporary, or trial, eRoom. Objects may also be represented by a table which includes as fields identification codes for each data object, one or more flags which are used to distinguish various objects, one or more flags which are used to determine the behavior of objects (editability, searchability, and others), a field indicating the date the object was created, a field indicating who created the object, a field identifying the parent of the object, and a field identifying the date the object was last modified, among others.

Figure 3:
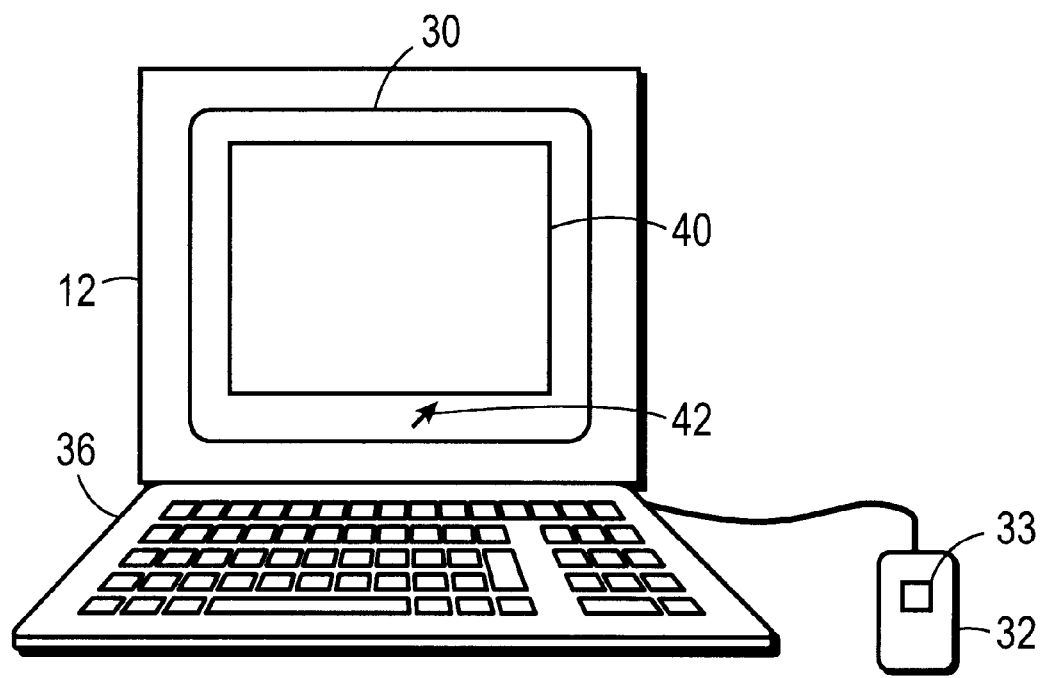
FIG. 3 is a diagrammatic view of a client workstation that may be used in the system of FIG. 1.

Referring also to FIG. 3, The client workstation 12' may be any machine that supports reception and transmission of data signals over an HTTP network. In general, a client workstation 12' is a personal computer executing a "browser" program to display an HTML page 40, on the screen 30 of the client workstation 12'. The user interacts with pages displayed by the browser utilizing a "point-and-click" interface, i.e., the viewing user uses a mouse 32 to manipulate a cursor 42 that is also displayed on the screen 30 of the client workstation 12'. Once the cursor 42 is over a particular portion of the HTML page 40, the viewing user signals by "clicking" or "double clicking" a button 33 on the mouse 32. Alternatively, the viewing user may also signal by pressing a key on an associated keyboard 36, such as the "return" key. In other embodiments, the viewing user may not use a mouse 32 at all, but may instead use a touchpad, a trackball, a pressure-sensitive tablet and pen, or any other input mechanism for manipulating the cursor.

The client workstation 12' uses a local database 20' to store data objects related to a project, while external files related to a project (such as a word processing document of a set of meeting minutes) are stored in the client workstation's 12' local file system. The client database 20' may be provided as a flat file database, relational database, multi-dimensional database, or object-oriented database. For example, a typical relational database that may be used to provide a client database 20' is Jet Database Engine, manufactured by Microsoft Corporation of Redmond, Wash. The database 20' stored on the client workstation 12' contains a relevant subset of the data objects stored by the server 14. That is, the database 20' stored by the server 14 typically will contain more information about a particular project than the database 20' stored by the client workstation 12'.

However, the database 20' stored on the client workstation 12' may contain tables which are not stored by the server database 20. For example, a client workstation 12 may store in its database an "unread" table which indicates which objects have been modified since the user of the client workstation 12' have last accessed those objects. An unread table may include a member identification field and a modification tag indicating the last modification date and time of an object. All records may be read from this table to identify to the client workstation 12' every item in a particular eRoom page which has not been read by the user, or a selective database query may be done to return only those objects belonging to a particular set of eRoom pages that have not been read by the user. If it is desired to provide this functionality, an additional entry in the unread table must be made to allow data objects to be distinguished based on some indication of affiliation.

Certain important information, such as hierarchy and navigation information, related to the project database 20 is considered "skeleton" information. Skeleton information is a set of database records that contain basic properties needed to display Web pages representing the project and therefore client workstations 12' require frequent updates of this information. Accordingly, it is generally desirable to exclude large information from skeleton information associated with a project, such as notes relating to an ongoing discussion, to facilitate transmission of the skeleton information to client workstations 12'.

The client workstation 12' uses project data received from the server 14 in combination with one or more template files to create and display to the user of the client workstation a private, secure collection of HTML pages that provide a virtual workroom for members of a team, whatever its size and wherever the members of the team are physically or corporately located, may be referred to throughout as an "eRoom", or an "eRoom page". An eRoom is a set of connected HTML pages displayed to a user that displays project-related files, data, and discussion lists. Members of a team may congregate, share work and files, discuss ideas, stay informed and otherwise collaborate on common projects using an eRoom.

Client workstations 12' generally have local memory elements for storing data objects of files associated with a project that are downloaded from the server 14 as well as one or more eRoom templates. A client workstation 12' may have an associated mass storage device such as a hard disk drive 16' or a tape drive 18' for storing the set of eRoom templates, although if a client workstation 12' is provided with enough RAM to store the set of eRoom templates, then the mass storage devices need not be provided.

Figure 4:
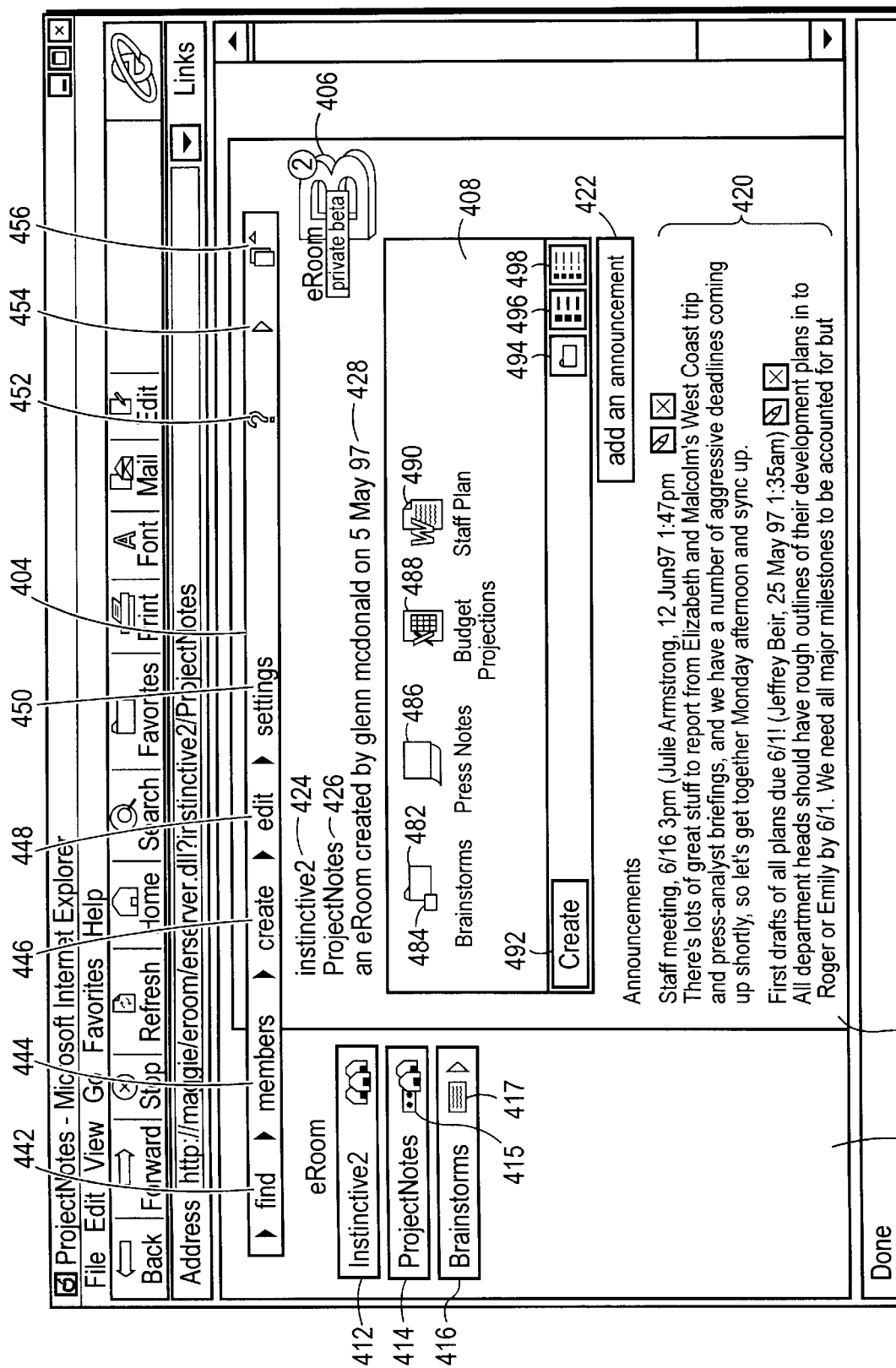
FIG. 4 is a screen shot of an HTML page viewed by a user of the system of FIG. 1.

FIG. 4 depicts an embodiment of an eRoom page 60 that a user might encounter while using a popular "browser" program, Internet Explorer, manufactured by Microsoft Corporation of Redmond, Wash. The eRoom page has five major elements: a page element 402; a navigation bar 404; a graphical identifier 406; an item box 408; and a shortcut list 410.

The page element 402 may include subelements. In the embodiment depicted in FIG. 4, a discussion 420 is embedded within the page and there is a facility to allow a viewer to contribute to the discussion 422. The embedded discussion 420 and the contribution facility 422 may be implemented as ActiveX controls, a JAVA applet, or various other means. Further, the facility name is displayed 424, as is the name of the viewed page 426 and a description of the viewed page 428.

The navigation bar 404 provides a number of controls for the viewer of the page. For example, in the page embodiment shown in FIG. 4, the navigation bar 404 provides eight commands; "find," 442 which performs a find for a specified object; "members," 444 which permits certain users to change the membership list and access levels associated with members; "create," 446 which allows certain users to create new items and pages; "edit," 448 which allows certain users to edit eRoom pages; "settings," 450 which permits settings for the display and management of eRooms to be changed; a question mark icon 452 which invokes a help system; a "next unread" icon 454 which displays to the viewer an unread item or file; and an up-arrow icon 456 which displays the "parent" of the eRoom currently being viewed, that is, it displays an eRoom page one logical level "up" from the currently viewed eRoom page.

The graphical element 406 is used to pictorially identify the viewed page. The graphical element 406 may be a corporate logo or other organizational identifier. The graphical element 406 may be static (as depicted in FIG. 4) or it may be a dynamic identifier such as a JAVA script or ActiveX control.

The item box 408 collects and displays items associated with the project represented by the page 402. In the embodiment shown in FIG. 4, the item box 408 contains a folder of items 482, a notes file 486, a spreadsheet file 488, and a word processing file 490, each of these being links to other eRoom pages or files. Other items which may be displayed in an item box 408 are version organizers, discussions, links, and vote/poll items which survey team membership on one or more issues. As will be discussed below in greater detail, a discussion item may be associated with any other item in an eRoom and a discussion item can be contained in an eRoom as a stand-alone item. In further embodiments, discussion items may be embedded within other items contained in the eRoom. Each discussion item may itself include at least one vote/poll item that allows discussion participants to decide issues related to the discussion. In some embodiments, the vote/poll item is presented to the user "in line" with a series of discussion group entries (see FIG. 10). A vote/poll item may also be included in an eRoom as a stand-alone item. The item box may also include a facility for creating new items 492. The item box 408 may also include icons which control how items are displayed in the item box 408. In the embodiment shown in FIG. 4, three icons are provided: an "icon display" icon 494 (currently selected) which causes items to be displayed as large icons with identifying text underneath; a "list display" icon 496 which causes items to be displayed as small icons with identifying text to one side of the icon; and a "report display" icon which causes items to be displayed as a list. The displayed list may be alphabetized, ordered by size of item, ordered by creation date, ordered by modification data, or ordered by some other data field associated with each item.

Items in the item box may include a graphical indication that it, or items contained within it, are unread. This may imply that the item has been newly created, or the item may have been modified since the viewing user last read it. In either event, the graphical indication signals the user that the item should be read. In FIG. 4, the "Brainstorms" folder 482 has an indication 484 that it is unread.

eRoom pages also may include a shortcut bar 410. The shortcut bar is a list of shortcuts which provide the viewer with a convenient way to access other eRoom pages. For example, in the embodiment shown in FIG. 4, a shortcut to the directory of eRooms is provided, as well as shortcuts to the page currently viewed 414 and a shortcut 416 the folder 482 displayed in the item box 408. The folder shortcut 416 includes a graphical indication that there are unread items in the folder 417. The shortcut to the front page of the eRoom currently being viewed 414 also includes a graphical indication that unread items exists in the page 415. Shortcuts may be added to the shortcut bar by the viewing user. In order to read the unread items in the folder 482, the viewing user may use the shortcut 416 to access the contents of the "Brainstorms" folder 482 and determine which items are unread or the user may simply click on the "next unread" icon 454. The shortcut bar 410 may be provided as an ActiveX control or as a JAVA applet or other means.

As noted above, users interact with eRooms by using Web browsers in a traditional manner. That is, users may traverse a hyperlink to access an eRoom, or users may directly enter a URL address into the browser. Regardless of the manner in which the URL address is accessed, the browser retrieves the HTML file in order to display it. However, if the URL address is an eRoom, the server of the file returns a file of control information, referred to as a "wrapper" file. The wrapper file is an HTML file which contains, among other information, an identification of the object to be displayed. The wrapper file delivers an object ID which is used by the client workstation 12' to look up the object in the local database 20 stored on the client workstation 12'. The local database 20 includes information about the object, including which eRoom template to use and information regarding any "children" the object may have (for example, items contained in the item box).

Generation, display, and management of eRooms is controlled by a "page builder" application residing on the client workstation 12'. The page builder application may be provided as specialized hardware or software operating on a general-purpose machine. In some embodiments, the page builder application may be provided as an Active X control or a COM object.

Figure 5:
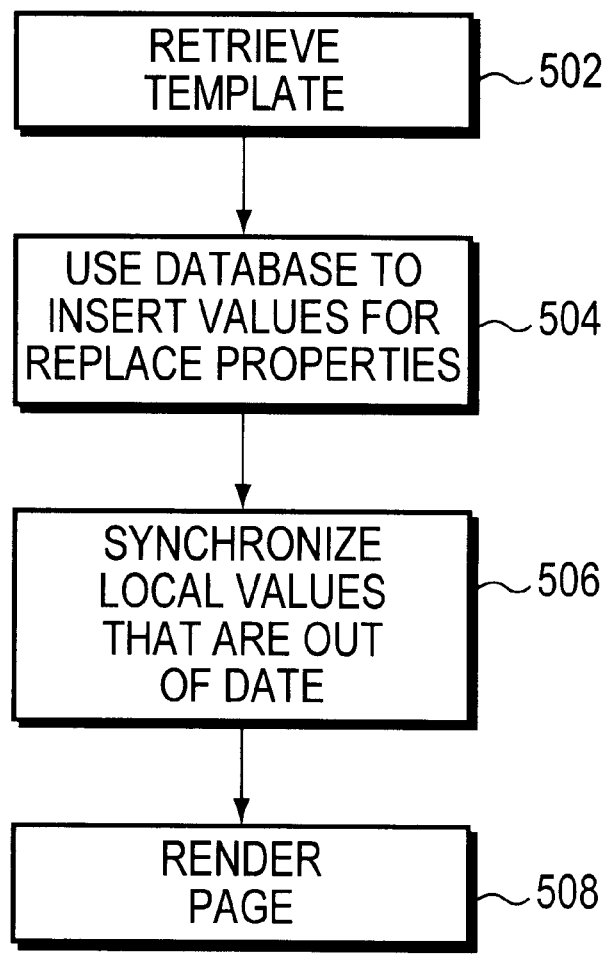
FIG. 5 is a flowchart of the steps taken by a client workstation to render an HTML page of the sort depicted in FIG. 4.

Referring to FIG. 5, the first step that is taken by the page builder application is to retrieve the eRoom template indicated by the wrapper file (step 502). An eRoom template is an HTML file having additional eRoom-specific information embedded in it. The eRoom specific information is generally distinguished from HTML tags. For example, eRoom-specific information in an eRoom template may be surrounded by "<<" and ">>". Any symbol or set of symbols may be used to distinguish eRoom-specific information so long as eRoom-specific information is distinguishable from HTML tags.

eRoom information in a template includes sections controlling the page itself, the controls on it, and the way the page's data is presented the page is created or edited.

The Template section controls several miscellaneous items about the template itself, for example, the Template Section may include name information, information specifying which thumbnail appears when the page template is selected, a description of the identifying text that appears under the thumbnail, how children (i.e. dependent pages) of this type of page are counted, and whether the page should open automatically when created. In one embodiment, the Template section of a Folder may be configured in the following manner:

```
Begin_Template
{
    category = container
    wizardname = "Folder"
    thumbnail = folder
    Icon = 0
    DYNAMIC
    {
        Suffix = "item"
        SuffixP1 = "items"
        OpenOnCreate = "no"
        Blurb = "A container for storing and organizing files, links and
            other pages."
    }
}
```

The template section above specifies the folder template's name ("Folder"), thumbnail, default icon, and identifying text (blurb). "OpenOnCreate" specifies that folders are not automatically opened when created, and "Suffix" and "SuffixPl" control the text that appears with the child count in the size column when a folder appears in an item box. DYNAMIC sections allow the template creator to add properties to a page that are not standard template properties. For example, in the example above, Suffix, SuffixPl, OpenOnCreate, and Blurb have been added to this template by the template creator. The following is an exemplary list of various template properties that may be used in embodiments of their invention:

Template properties

Category: specifies which set of icons is presented when a "Change Icon" command is attempted on items with this template. Valid choices are "container" (for folders and version organizers), "content" (for note pages) and "discussion" (for discussions). Discussion notes do have a category ("note"), but actually they never appear with icons.

Wizardname: specifies the name of the template when it appears as a choice in the page wizard. "Folder" and "Note" are examples of these.

Thumbnail: which thumbnail to display when this template is selected in the page creation facility. Thumbnails may be .bmp files stored in a predefined subdirectory which refers to them by name without the .bmp extension.

Icon: the index number (within the icon set specified by "Category") of the default icon for items with this template.

Suffix: the string to use after the child count in the size column when items with this template appear in the item box, e.g., "item" for folders, "note" for discussion, "version" for version organizers. This property must be placed within the braces of a "DYNAMIC{ }" subsection within the Template Section.

SuffixPl: the plural version of the Suffix. e.g., "items", "notes", "versions".

OpenOnCreate: whether or not to open new items of this type automatically when created. "No" for folders, generally "Yes" for everything else.

Blurb: the identifying text that appears under the thumbnail when this template is selected in the page wizard.

The Control section(s) appear for each eRoom discussion or item box on the page, setting various properties like the column headers of an item box, or the sort-direction of a discussion. In one embodiment, the Control section for the item box in a Folder may be configured in the following manner:

```
Begin_Control
{
    controlname = ERPage
    wizardname = "contents"
    childtype = "container,discussjon,content,external,link"
    defaulttarget = yes
    DYNAMIC
    {
        InitialView = "Report"
        ShowCreation = FALSE
        ShowModifyTme = True
        ModifyWidth = 116
        SizeWidth = 68
        Width = 443
    }
}
```

The "DYNAMIC" section for the example above specifies that the item box in a Folder starts displaying items in Report display, does not show a column for creation date, does show the time along with the date in the Modified column, and has modified column widths. The following is an exemplary list of various control properties that may be used in embodiments of the invention.

Control properties controlname: the section to which the control applies.

childtype: which categories of templates may be created of this page.

defaulttarget: set if the template has an item box into which items dropped on the icon for this page should go.

excludechildcount: set on item boxes or discussion whose children or notes should not count as part of the page's size, like the Attachments box on a Note page, and the embedded discussion areas on folders and version organizers.

substorage: set if creating one of these should also create its first child. Used for discussion, so that the page wizard for creating a discussion also prompts the user to title and enter the first note.

InitialView: specifies the initial display mode of items on this page (Report, Small icon, Large icon). This property must be placed within the braces of a DYNAMIC { } subsection within the control template.

SwitchViews: allows the page to hide from a user the ability to switch modes. This property must be placed within the braces of a DYNAMIC { } subsection within the control template.

CreateLabel: overrides "Create" as the creation button label. This property must be placed within the braces of a DYNAMIC { } subsection within the control template.

TitleWidth: specifies the title column width. Otherwise, the title column will size itself dynamically to fill the space left by the other columns. This property must be placed within the braces of a DYNAMIC { } subsection within the control template.

CreateWidth, ModifyWidth, OwnerWidth, SizeWidth: used to specify alternate column widths. This property must be placed within the braces of a DYNAMIC { } subsection within the control template.

TitleName, CreateName, ModifyName, OwnerName, SizeName: used to override "Name", "Created", "Modified", "Owner" and "Size" as the column names. This property must be placed within the braces of a DYNAMIC { } subsection within the control template.

ShowSize, ShowOwner, ShowModification, ShowCreation: allowing display or concealment of these columns. This property must be placed within the braces of a DYNAMIC { } subsection within the control template.

ShowCreateTime, ShowModifyTime: set to show time, along with date, in these columns. This property must be placed within the braces of a DYNAMIC { } subsection within the control template.

ShowSizeSuffix: allows the size column just show a raw number, not "x notes", "x items", etc. This property must be placed within the braces of a DYNAMIC { } subsection within the control template.

SortColumn: set this to "Create", "Modify", "Owner", or "Size" to specify a column other than the name as the initial sort key.

SortAscending: specifies reverse or normal sort.

ShowHeader: set this to "False" to hide the column headers.

Width: set this to the width of the item box. This property is used to make sure the icons for newly created items are given the correct XY coordinates for Large Icon mode.

AnnotationTarget: set this to the name of an item box in the current template to make the Edit New Version command appear for items in this item box. The new copies will be sent to the item box specified.

The Wizard section: this section defines the functions used for creating and editing the page. Each widget in the wizard is listed here, with properties controlling what sort of widget it is (checkbox, plain text or rich text), the text of the prompt that appears before it, and the default value. The Wizard section in a Folder looks like this:

```
Begin_Wizard
{
    Name
    {
        widgettype = text
        prompt = "Name"
        default = ""
        indent = 32
        DYNAMIC
        {
            longdescription = "Choose a name for this folder, and
            add a description of you want one."
        }
    }
    Use Description
    {
        widgettype = checkbox
        prompt = "Show description"
        default = TRUE
    }
    Description
    {
        widgettype = rich_text
        prompt = ""
        default = ""
        indent = 0
        DYNAMIC
        {
            richtextheight = 153
        }
    }
    UseComments
    {
        widgettype = checkbox
        prompt = "&Include space for comments"
        default = TRUE
    }
}
```

The widget section described above specifies four editable widgets in the wizard: a text box for the title, checkboxes for whether or not to use the description and the embedded discussion, and a rich-text box for the optional description. The following is a list of wizard properties that may be used in various embodiments of the invention.

Wizard properties

Widgettype: which edit widget to use for the property. Can be "text", "rich-text" or "checkbox".

Prompt: the text to show before the widget.

Default: the default value for the property

Indent: how much to indent the widget to the right of the prompt. An indent of 0 means to put the widget below the prompt, not the right of it.

Longdescription: This property must be placed within the braces of a DYNAMIC { } subsection within the control template used on the first widget in the Wizard section, to provide an optional extra line of instructions to appear at the very top of the wizard page.

Richtextheight: used on rich-text widgets, to control their height. This property must be placed within the braces of a DYNAMIC { } subsection within the control template.

The header for many pages also includes an "INCLUDE" tag, which refers to additional header information for embedded discussions (see below), which is stored in a separate template for convenience.

Referring once again to FIG. 5, once the appropriate template has been retrieved from mass storage associated with the client workstation (step 502), the next step taken by the page builder application is to replace all of the Replace Properties contained in the template with project information from the project database (step 504). Following is a list of exemplary Replace Properties:

Replace properties

Name, Description, UseDescription, UseComments: editable properties from the page wizard.

$ROOM: the name of the eRoom.

$CREATOR: the creator of the eRoom.

$CREATEDATE: the date and time the eRoom was created. Allowable formats are "short," which displays some abbreviated form of the date such as date-slash format or month-year format, and "long," which displays the full year including month year and day.

$ERDATADIR: the full path subdirectory in which eRoom data for the page is stored.

$DISCUSSIONBODY: the body of a discussion.

$DISCUSSIONINDEX: the list of note titles used for the sidebar index in discussions.

In order to fully render an eRoom the page builder application uses the portion of the project database which is stored locally on the client workstation 12', as well as any files which are stored locally, to "fill in" any replace properties contained in the template. For example, if the page builder application encounters a $DISCUSSIONBODY replace property, it accesses the local database 20 cells that contains the discussion indicated by the replace tag and includes the text of that discussion in the rendered eRoom page. The page builder application may be written as a procedural routine that examines an eRoom template for a particular set of replace properties; in this embodiment, the page builder application would need to be rewritten whenever a new replace property is defined.

Because multiple users may concurrently, and even simultaneously, perform work on a project, the page builder must ensure that the objects from the local database and locally stored files are not stale before inserting them into the eRoom template (step 506). Put another way, the client workstation's local project database 20' must be synchronized with the server's project database 20 to ensure data coherency. Synchronization may be done in at least four different ways: (1) periodically in the foreground; (2) event-triggered in the foreground; (3) periodically in the background; and (4) event-triggered in the background. If synchronization is done in the foreground, then the user is blocked from performing any work while the synchronization occurs. Background synchronization allows the user to continue working. For example, the object ID for an object is used to query the local database 20'. The object record may include a modification tag value (as described above), or each data object may be provided with one or more state bits which can be set to indicate the file or data is stale. If the modification tag value or state bits indicate that the object needs to be synchronized, the updated object may be requested from the server in the foreground or in the background. Alternatively, a client workstation 12' may periodically search its entire local database 20' for objects which need to be updated. This may take the form of a database query for objects having a modification tag value less than the current value, or a database query for objects having a particular value for state bit fields. Objects returned by the query are requested from the server as discussed above.

Synchronization is enabled by storing all records in the server database with an associated modification tag. The tag is a positive integer which is taken from an ever-increasing counter. The counter increments each time it is read, i.e., each time a new modification tag is assigned to a data object stored on the server 14. When a client workstation 12' synchronizes its local databases and files, it also receives the current modification tag, i.e., it also receives the current value of the counter. Alternatively, the current modification tag value can be included as extra information in each "wrapper page." The client workstation 12' includes the last modification tag value it received when it makes a subsequent synchronization request. The server 14 transmits to the client workstation 12' any data objects to which the user has appropriate access rights that also have a modification tag value greater than the modification tag value sent with the synchronization request. The client workstation 12 stores the received data objects in its local database and stores the new received modification tag value. Client workstations 12' and servers 14 may be separated by relatively slow, lossy channels such as telephone networks. Accordingly, synchronization requests can sometimes fail for various reasons, e.g., a connection node is out of service or a necessary transmission line suffers too many errors to allow a reliable connection to be made. In this event, the synchronization request fails and should be retried later.

Once synchronization has been accomplished and local database metadata has been updated, the appropriate data objects and values are inserted into the eRoom where indicated by Replace Properties, and the eRoom is displayed to the user (step 508) by the browser application in a traditional manner (refer to FIG. 4).

Files displayed by an eRoom may be viewed or edited by team members having the appropriate access controls (discussed in more detail below). A user indicates that a particular file should be retrieved from the server for editing or viewing by any one of a number of traditional methods, such as double-clicking, selecting the file and pressing the "Enter" key on the keyboard, or pressing the right-hand key on a mouse input device and selecting the appropriate action from the displayed pop-up menu. File download and subsequent upload, if necessary, is managed by a background daemon. Alternatively, file upload and download may be managed by a separately executing program; the only requirement is that the file upload/download application executes separately from the browser application, so that premature exiting of the browser program is handled appropriately by upload/download code.

Figure 6:
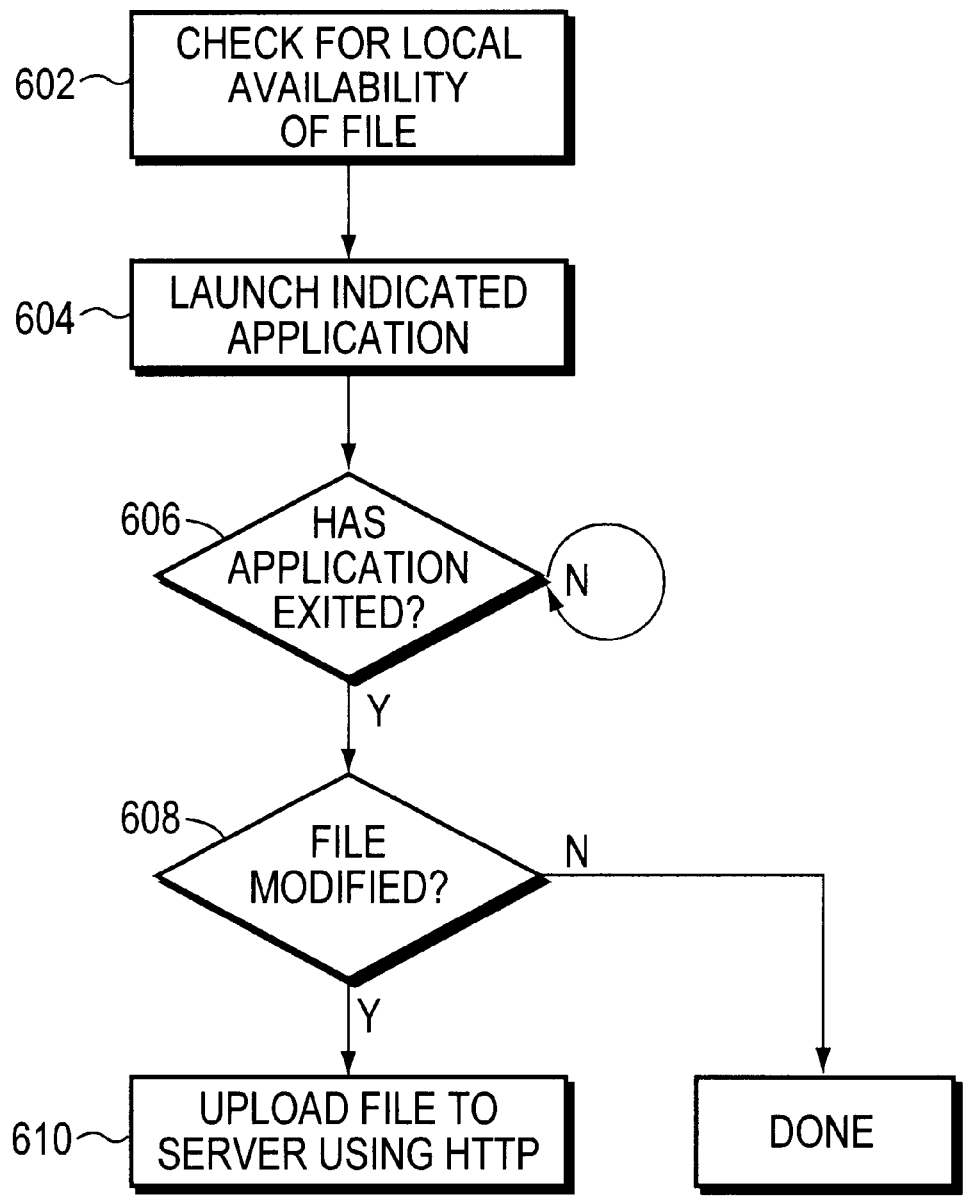
FIG. 6 is a flowchart of the steps taken by a client workstation to allow users of the system to edit files.

Referring now to FIG. 6, the first step taken by the background daemon is that the local file directory is checked to determine if the selected file is already resident in local mass storage associated with the client workstation 12' (step 602). If the file is not present or is stale, then it must be downloaded from the server 14. The file is checked to determine whether another client workstation 12 has caused an edit lock to be set on the file indicating that the file is being edited. This may take the form of a database query for the object ID associated with the file which returns at least the metadata associated with the file indicating presence or absence of an edit lock. If no edit lock has been set for a requested file, the access rights of the requesting user are checked. If the user has appropriate access rights, i.e., "can edit" if the user has indicated editing will occur or "can view" if the user has indicated only viewing will occur, the user will be allowed to retrieve the file. In the case of a user that indicated editing will occur, an edit lock is set before the file is downloaded. This ensures that no other user will be able to download the file for editing purposes while the edit lock is set. The requesting user is blocked from further work until the file download is complete. File transfers are accomplished using HTTP and this process is described in more detail below.

Once the file has been downloaded, or if the file was already present in local mass storage, the Watcher launches the application used to edit the file (step 604). The indicated application may be determined using the Object Linking and Embedding standard (OLE), the file suffix (three characters in a DOS-based system), or the server 14 may store file metadata which is transmitted together with the file and indicates which application should be used to open and edit the file. If the server 14 stores file metadata, a list of alternate applications may be stored, either on the server 14 or the client workstation 12, so that if a client workstation does not have access to a first application, other applications are specified which may be used.

The background daemon waits for the indicated application to exit, or the document to close, before taking further action (step 606). Once the application has exited, the background daemon determines if the file has been modified (step 508). If not, the background daemon does not need to take further action, except for freeing the edit lock if one was set. However, if the file was modified, then it must be uploaded to the server 14 using HTTP (step 610). The file upload may be done in the background or in the foreground. If done in the foreground the user will be blocked from further work on that file until the upload is complete. Once the upload is complete, the server 14 updates metadata stored in its database 20 that is associated with the file, for example, any edit lock set by the editing user is released.

As noted above, users may perform work on files and objects locally and upload the modified files and objects to the server 14 for viewing, comment, or further modification by other project team members. The systems and method of the present invention allow users to upload newly created and modified files to a server 14 using an intuitive drag-and-drop method.

Figure 7:
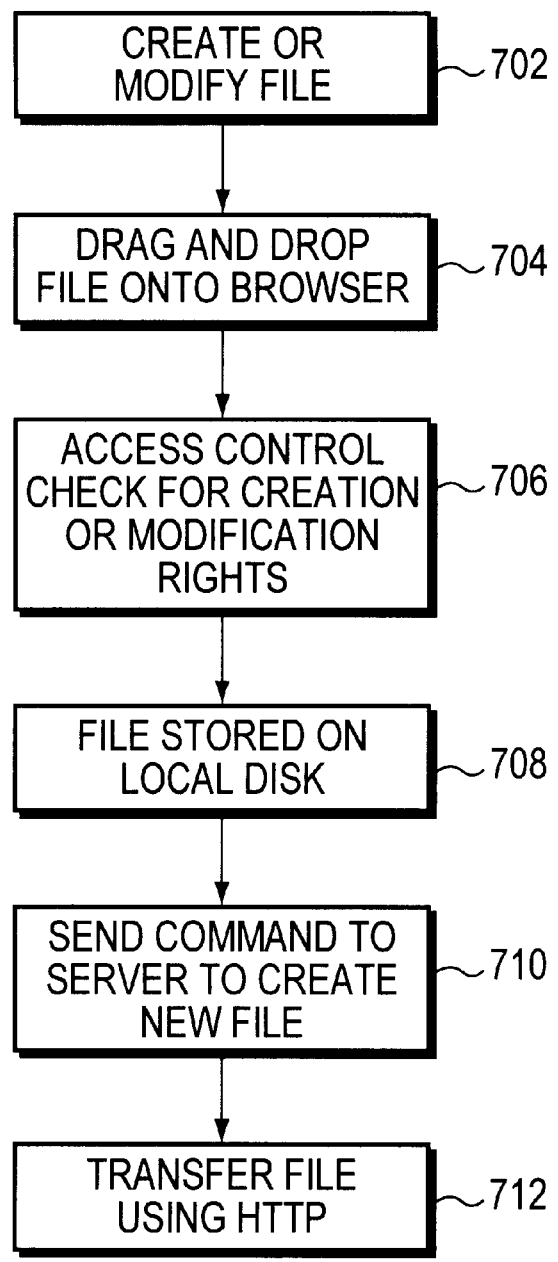
FIG. 7 is a flowchart of the steps taken by the client workstation to allow users of the system to upload files to a server using a "drag-and-drop" interface.

Referring now to FIG. 7, a user creates a new file or modifies a file downloaded from the server 14 (step 702). It should be understood that this step includes actions such as creating a new version of file locally so that other users may still check out the "original" copy of the file present on the server 14. Once the user is finished editing the file, it may be uploaded to the server 14 to allow other users access to it. The user signals that the file should be transmitted to the server 14 by dragging the file onto an eRoom displayed by the browser (step 704). Dropping the file into the displayed eRoom invokes an ActiveX control or a background daemon process which manages the upload of the file to the server 14.

The user's access rights are checked to ensure that the user possesses "create" or "modification" rights for the page to which the user desires to upload the file (step 706) and the file to be uploaded is stored to local mass storage (step 708). Access rights may be checked over the network in many ways. For example, each object may be provided with a field or fields which identify users that may open, view, and edit the object. Alternatively, an object may assign a pre-defined value to a field which controls access to the object. For example, a "coordinator" role may be defined and an object may identify that any coordinator may edit, open or view it.

If the user has the appropriate rights, then a command is sent to the server to create a new file (step 710). This step may be skipped if the user is modifying a file instead of creating a new file. However, creation of a new file allows the server to provide a degree of fault tolerance and version control, if those features are desired. If the server has been instructed to create a new file, a new object is created containing metadata associated with the data file and the file is transmitted to the server 14 using HTTP (step 712). If a file modification is occurring, the server 14 updates the metadata contained by the data object associated with the file and the file is transmitted to the server 14 using HTTP (step 712). The server 14 associates the uploaded file with the newly-created data object.

File metadata may include: the name of the file; the size of the file; the date the file was created; the date the file was last modified; access information such as which users may open, view, and edit the file; and information regarding the edit status of the file, such as whether an edit lock has been set by a user.

HTTP Transfer Protocol

Throughout the specification, whenever reference is made to transmitting data to or from a client workstation 12', the transfer is accomplished using HTTP. While this is the traditional way to transmit HTML files from severs to clients, it is not used to transmit HTML files from clients to servers. The systems and methods described herein use HTTP to transmit large files of data, such as word processing files, spreadsheets, etc. The advantage of using HTTP to transmit all project data is that users from different organizations can easily and transparently share data since data transmitted by HTTP will be more compatible with firewalls or other security mechanisms established by their respective organizations.

Figure 8:
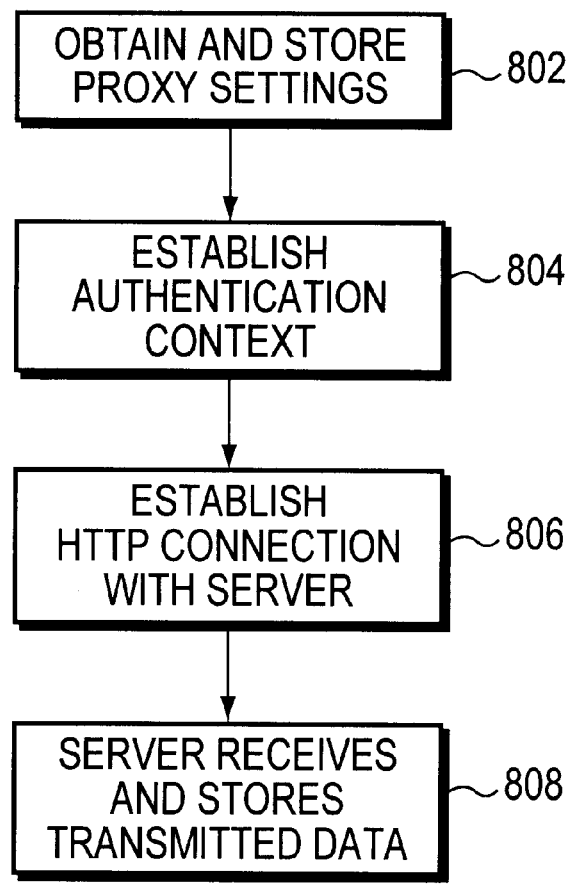
FIG. 8 is a flowchart of the steps taken by the system to transfer a file using HTTP.

Referring now to FIG. 8, the first step in transmitting data using HTTP is that the client workstation 12' obtains any proxy server settings in use by the browser application executing on the client and stores those proxy settings for later use (step 802). The client workstation establishes an authentication context by connecting to a server using a series of HTTP commands (step 804). This is much like the process used for logging into a server 14 hosting eRooms, and is described in greater detail below. An authentication context may be any method for establishing the identity of a remote user; a common context is a username-password pair.

The client workstation 12' establishes an HTTP connection to the server 14 (step 806) using the proxy settings stored in step 802 and sends an HTTP POST request to the server 14. The HTTP POST request includes: a URL identifying a directory located on the server 14 where the data should be stored; an identification code uniquely identifying the data; a header containing information about the data such as authorization information; and the data itself.

Once the eRoom server 14 has verified the uploading user's authentication context, e.g., username and password pair, it receives the data and stores it based on the document identification code transmitted in the HTTP POST command (step 808).

Access Control

As noted above, the eRoom skeleton is the set of database records that contain the basic properties needed to display an eRoom. The concept of skeleton information provides a first level of access control, because only data objects stored in "containers" for which a particular user has Open privileges are synchronized to that client's workstation 12'.

Since every file and eRoom item is represented as an object in the database, access of users to each item can be controlled by entries in the database schema. For example, every eRoom may be represented by a table which has one or more of its fields a list of the members that are entitled to enter the eRoom. In some embodiments, users may be divided into three separate groups: coordinator; reader; and participant. In this embodiment, a coordinator can add members to the eRoom and may supersede any rights granted to users. A reader is someone who has access to the eRoom solely to view the content of that eRoom while a participant is a user that may access the eRoom and may edit the objects and files contained in the eRoom as well as upload new objects and files to the eRoom. User access may be checked by running the database query on the appropriate table and only allow a user to access the eRoom when that user's name or authentication context appear as an entry in the table, i.e., is returned from the database query as a result.

Some embodiments, include a "persist layer" which provides persistent storage to a relational database. The persist layer provides an application program interface which allows application programs to issue individual commands to relational databases, each command providing a flexible number of input parameters and output return values. Each persist command may be mapped to a database query statement that is used when the command is executed. This mapping is encapsulated, i.e., hidden from clients of the persist layer. Encapsulation of the persist commands allows them to be redirected to different databases or optimized without requiring the client application program to be modified.

In another embodiment, the persist layer described above is based on the ODBC protocol. ODBC allows an application program to "prepare" a data query and then execute the prepare statement multiple times. Execution of prepared statements offers significant performance improvements. The "persist layer" may further monitor which statements are executed most often. Based on statement execution counts, statements may be dynamically prepared based on their usage. In some embodiments, a statement may be prepared for a limited period of time, after which it is "unprepared." Alternatively, a statement may be prepared after a certain number of uses and then be unprepared if it is not used within a certain period of time.

Discussion and Vote/Poll Items

Figure 9:
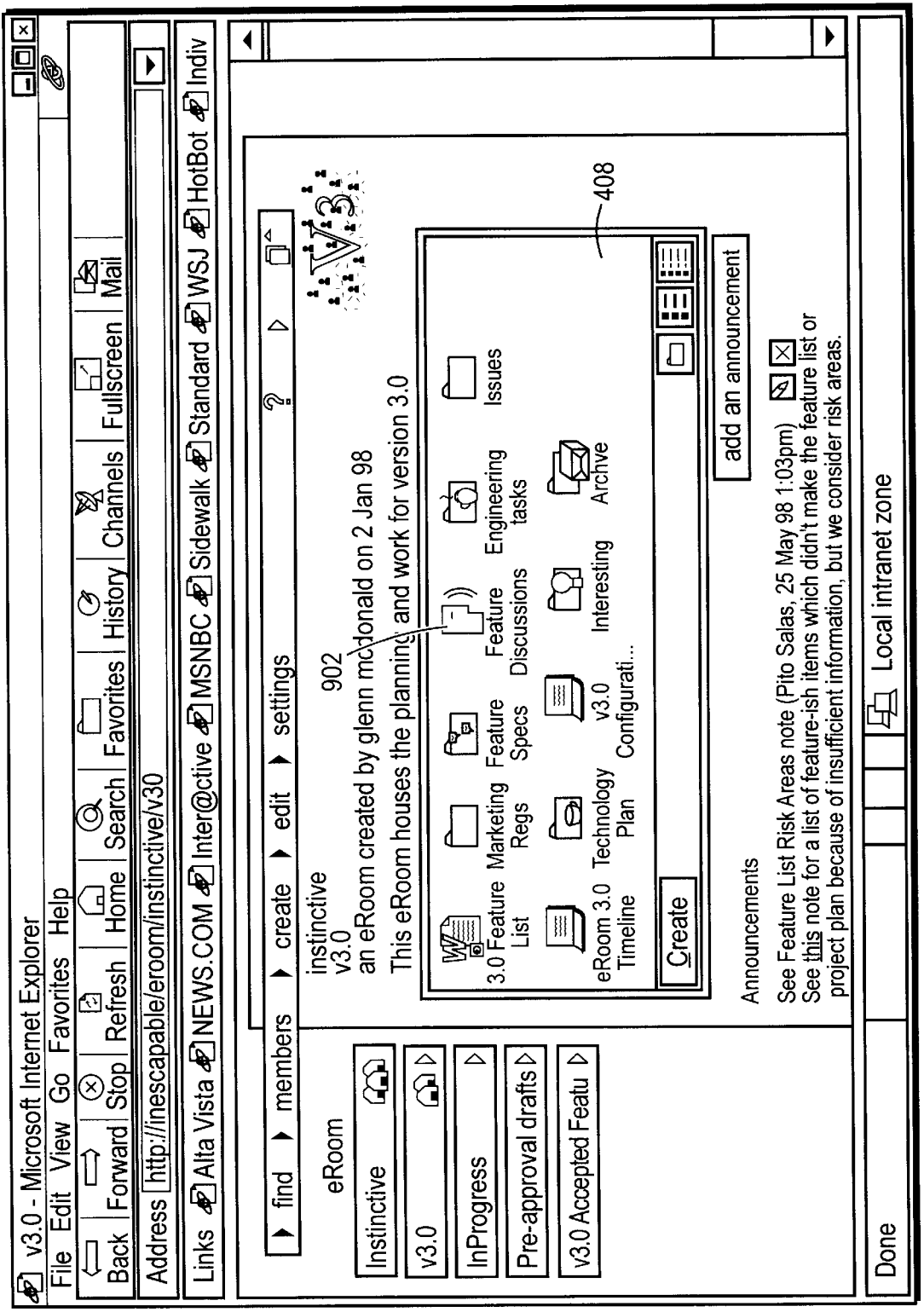
FIG. 9 is a screen shot of one embodiment of an eRoom containing a discussion group item in the item box.
Figure 10:
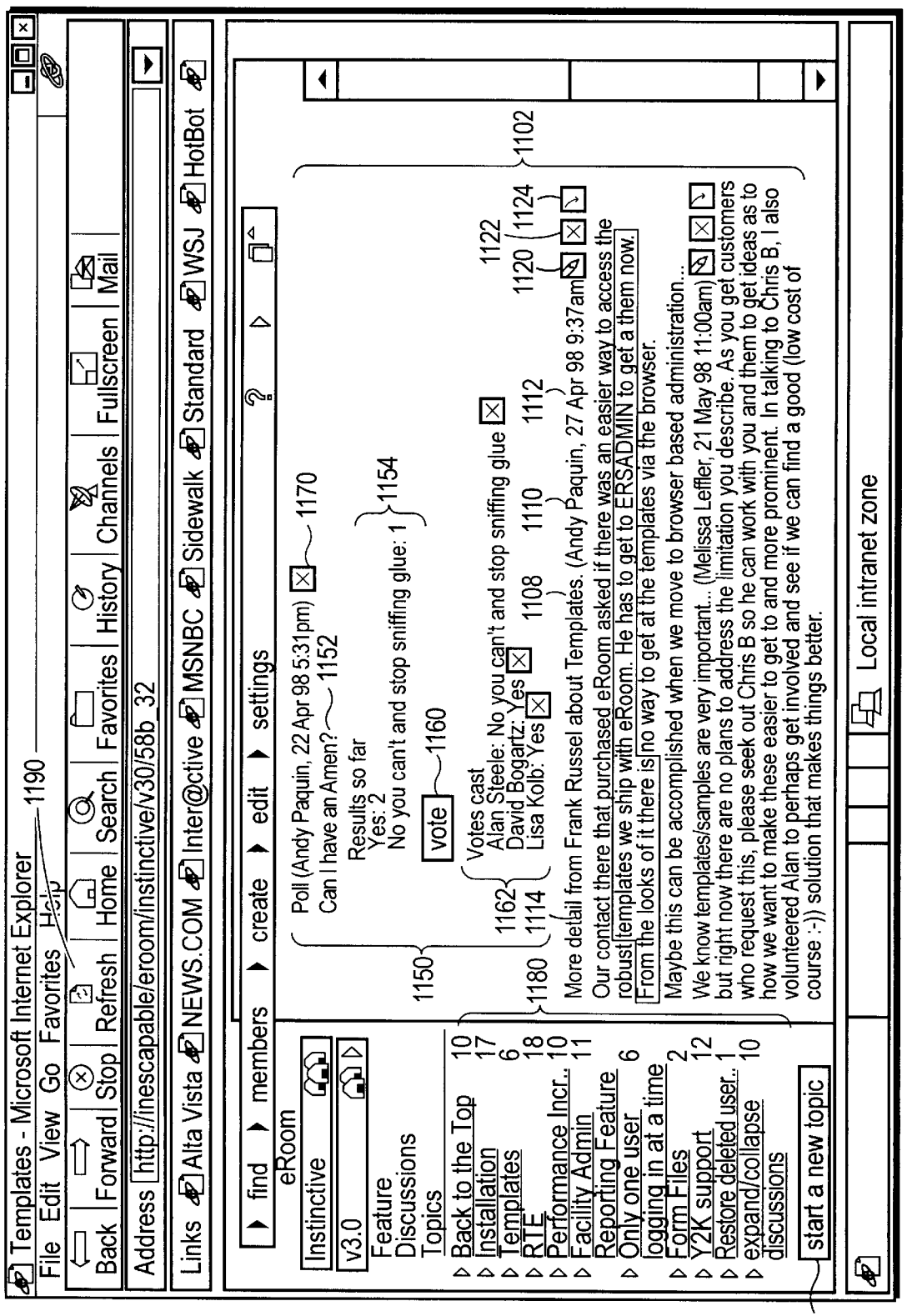
FIG. 10 is a screen shot of one embodiment of an eRoom displaying a discussion group item.
Figure 11:
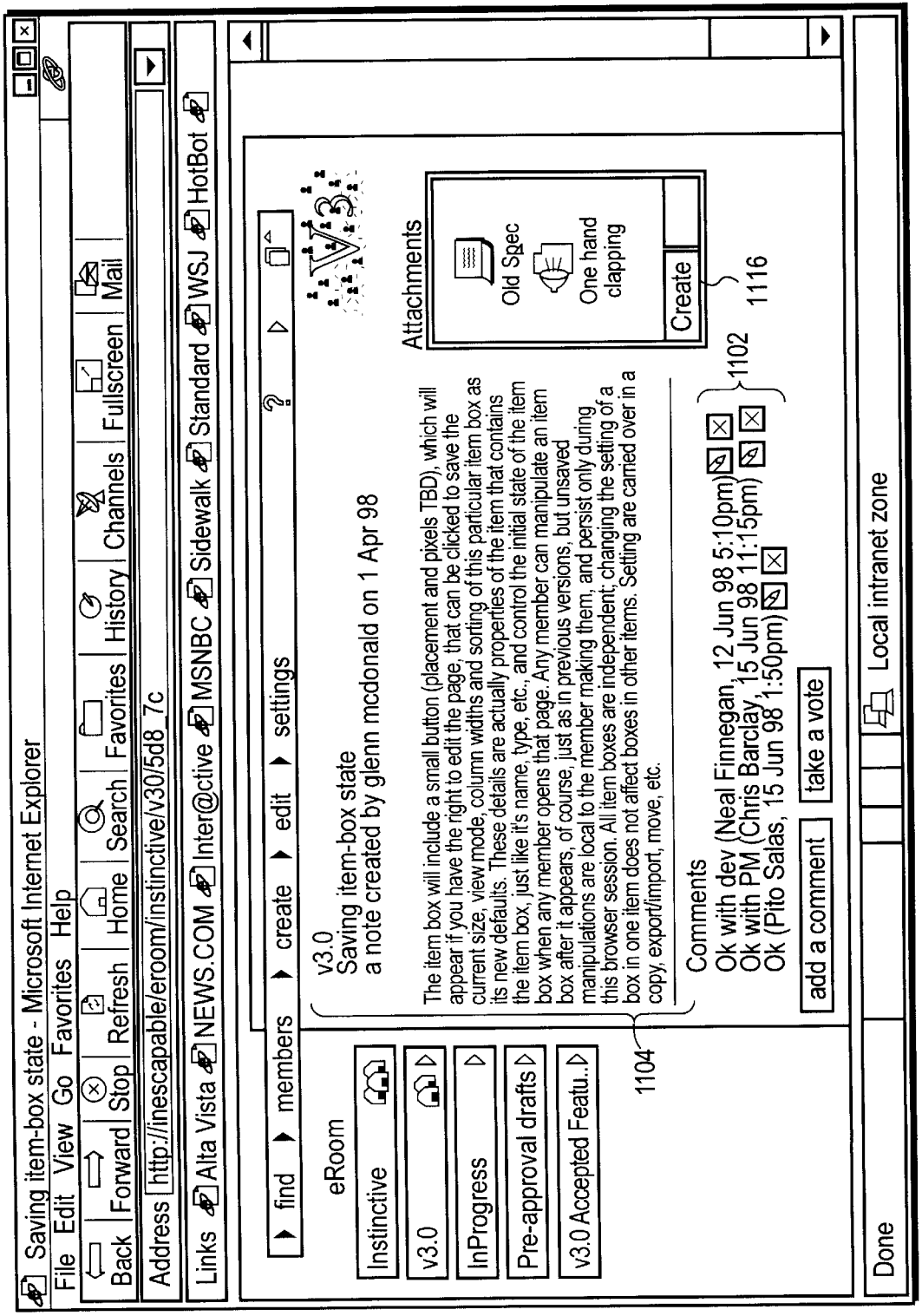
FIG. 11 is a screen shot of one embodiment of an eRoom displaying a discussion group item associated with an item.

As noted above, discussion items and vote/poll items may be associated with other items contained in an eRoom or those items may be independent of other items. FIG. 9 depicts an embodiment of an eRoom that contains an independent discussion item 902 in the item box 408. When provided as an independent item in an eRoom, discussion items 902 and vote/poll items behave as any other item. That is, they may be moved, renamed, or opened by double clicking. FIG. 10 shows an example of a discussion item that has been opened by double clicking. Alternatively, a discussion item may be associated with a particular item or otherwise embedded within an eRoom or item contained in an eRoom. FIG. 11 depicts an embodiment of an invention in which a discussion item 1102 is associated with a note item 1104. In this embodiment, the discussion item 1102 allows users to provide comments they may have regarding the note item 1104.

As noted above, when a discussion item is associated with an eRoom page, a $DISCUSSIONBODY replace property is embedded in the HTML code representing the eRoom which contains the discussion. When a page builder application encounters a $DISCUSSIONBODY replace property, the application accesses the local database 20 cells that contain the discussion indicated by the replace tag and includes the text of that discussion in the rendered eRoom page. Thus, in the embodiment shown in FIG. 11, the eRoom would have a replace property embedded in the HTML code representing the eRoom for the discussion group associated with the note.

As shown in FIG. 10, individual entries in discussion group items may include an indication of the subject of the entry 1108, an indication of the author of the contribution 1110, the date and time of the contribution 1112, and the contribution to the discussion itself 1114. In the embodiment shown in FIG. 10, each contribution to the discussion group also includes a modify icon 1120 for creating a discussion group entry that may have been precipitated by the entry, a delete icon 1122 which allows authorized users to delete the entry, and an immediate reply icon 1124 which allows a reply to the discussion item to be created. Immediate replies are, in one embodiment, associated with the entry proximally. In one particular embodiment, immediate replies are indented and appear directly beneath the entries to which they respond. Access to a discussion group entry to delete or modify it is controlled as described above.

FIG. 10 shows a stand-alone discussion group. A stand-alone discussion group has a richer set of features than a discussion group associated with an item. For example, a stand-alone discussion group includes one or more topics of discussion 1180. Each individual topic represents a "thread" of discussion in a discussion group. In the embodiment shown in FIG. 10, a thread called "Templates" is currently displayed. Another thread can be viewed by clicking on the desired hypertext topic. Users may also add new topics. In the embodiment shown in FIG. 10, a "start a new topic" button 1182 is provided. A user begins a new topic by clicking on the button 1182.

Stand-alone discussions may have attachments associated with them. In the embodiment shown in FIG. 11, the note item 1104 has an attachments area 1116 associated with it. Data, files, and other items can be dragged and dropped into the attachments area 1116. Thus, for example, a stand-alone discussion group may have an attachments area 1116 associated with it to allow discussion group participants to post material collateral, or supportive, of the discussion.

FIG. 11 shows an embodiment of a discussion group associated with a note item. A discussion group that is not a stand-alone item will be referred to as an "embedded discussion." In the embodiment depicted in FIG. 11, embedded discussions have no provisions for "threads," that is, there is only one topic for discussion. Also, users are not given the ability to create immediate replies to previous discussion items in this embodiment. In other embodiments, users may be given the ability to make immediate replies and create "thread" topics in embedded discussions.

In the course of conducting a discussion on a particular topic of interest, whether embedded or stand-alone, a contributor to the discussion may survey the discussion group members with regard to a particular question. To do this, the contributor creates a vote/poll item using the create control 446 (shown in FIG. 4). FIG. 12 depicts one embodiment of a dialog box displayed to a user that has selected the create control 446. The dialog box 1200 includes a number of controls allowing the user to specify the form the vote/poll item will take, as well as the content of the vote/poll item. For example, in the embodiment depicted in FIG. 12, the user is able to select the font in which at least some portion of a vote/poll question will be presented to discussion participants using the font pull down menu 1202. Similarly, the user is able to select the size of at least some portion of the question using the font size pull down menu 1204. Controls may also be provided for allowing at least some portion of the question to be presented to users in bold text 1206, italicized text 1208, underlined text 1210, left justified text 1212, centered text 1214, and right justified text 1216. In this embodiment, the create dialog box 1200 also includes a free text entry field 1220 into which the creator of the vote/poll item can enter an alphanumeric string representing the question to be put to the participants. The create dialog box 1200 may also include a free text entry field for allowable votes that may be cast by a discussion group member. In this embodiment, the creator of a vote/poll item has entered three choices that discussion group members can choose: yes; no; and try later. The create dialog box 1200 also allows users to provide alternate means of responding to the vote/poll question. In the embodiment shown in FIG. 12, two check boxes are provided that allow the creator of the vote/poll question to allow write-in votes 1222 or to allow a discussion group member to cast multiple votes for the same question 1224. In the embodiment shown in FIG. 12, the create dialog box 1200 also provides a check box allowing the creator to have the responses to the vote/poll question be public or private 1226. The creator creates a vote/poll item by clicking the finish button 1250 after entering information in the create dialog box 1200. If the creator elects not to create a vote/poll item, then the user may click the cancel button 1252.

Referring back to FIG. 10, a vote/poll item 1150 is depicted as it might appear embedded in a discussion group. As depicted in FIG. 10, the vote/poll question entered in the free text dialog box 1220 appears as a question to the user 1152. The vote/poll item 1150 presents the results of the survey at the time the user accesses the discussion group. Because of the dynamic nature of HTML pages, the polling mechanism updates the results of the question at the location it is embedded in the discussion group item. The results of the vote/poll may be updated when the client local database is synchronized, as described above, or the results of the vote/poll may be updated by the user clicking the refresh control 1190 provided by the browser. The vote/poll item also provides a mechanism for each viewer in the discussion group to vote. In the embodiment shown in FIG. 10, a vote button 1160 is provided. The vote/poll item depicted in FIG. 10 also shows the votes cast in response to the survey 1162. This feature is enabled when the check box for showing each person's vote 1226 is checked in the create dialog box 1200. The vote/poll item also provides a mechanism for the creator to delete the vote/poll item once a decision has been reached. In the embodiment shown in FIG. 10, a delete control 1170 is provided associated with the vote/poll item.

In other embodiments, the vote/poll item may provide other controls which can be configured by the creator of the vote poll item, such as requiring each user to vote, allowing certain users to have the option to vote but not requiring them to vote, notifying certain users to vote, specifying a list of users that are required to vote for a result to be valid or reminding users to vote after a predetermined amount of time has passed without a vote being cast by that user. The vote/poll object controls the number of votes that may be cast by any member and, in certain embodiments, limits the number of votes a member can cast to one. Such a feature may be provided by consulting the database entry representing the vote/poll item before accepting a vote from a user. In particular, if a user submits a response to a vote/poll item, the server compares the identity of the user submitting the response to the database item representing the vote/poll item to determine if the user's identity already exists in a list of users that have responded. If the user's name appears as having previously submitted a response, then that user's submission may be discarded. In a particular embodiment, once a user has cast a vote, the "vote" button 1160 does not appear or appears "grayed out." Access to a vote/poll item in order to edit or delete that item is controlled as described above.

Licensing and Distribution

Figure 13:
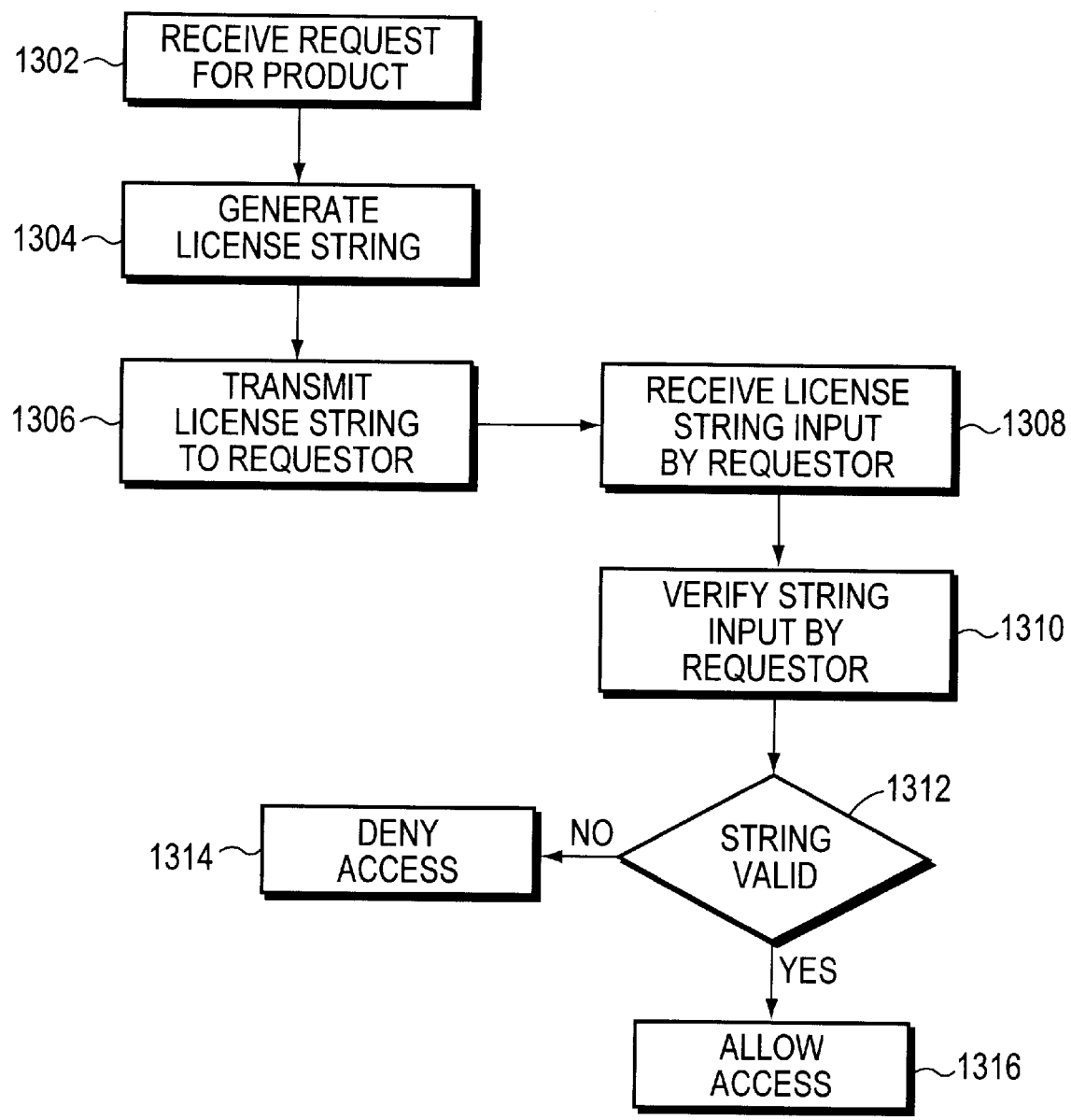
FIG. 13 is a flowchart of the steps taken to electronically distribute and control access to a file.

A method and apparatus for distributing the product to users that ensures only licensed users are able to use the product will now be now described. Although the method and apparatus will be described in relation to the systems described above, it should be understood that the distribution methods and systems described may be used generally for any product. Referring now to FIG. 13, the steps to be taken to electronically distribute and control access to a product are shown. A request for the product to be distributed is received (step 1302). The product request may be received via network means, by mail, by telephone, or in person. For embodiments in which product requests are received via network means, the product requests may be received by a server node. The server node receiving the request, in one embodiment, both stores the product and receives the request. In other embodiments, the server may also respond to the received requests. In still other embodiments, the server receiving the requests may not store the product but instead may communicate with other servers which store the product and respond to the request when notified by the server node receiving the product request.

After a product request is received, a license string is generated (step 1304). The license string is generated substantially at the time the request is received. The string may be generated upon receipt of the request but not transmitted to the requestor until payment is verified, or the string may be generated after payment is verified. The license string may be derived from information associated with the product, information associated with the request, or other information that allows the license string to be verified when entered into the product by a user to gain access to the product. In some embodiments, the license string may be generated from the version of the product that is to be delivered. In other embodiments, the license string may be generated based on the creation date of the product, or the date of the product request. In the foregoing description, reference made to date should be understood to include both date as well as date and time together. In one embodiment, the license string is generated using a checksum which may be validated by the product before allowing a user access. In other embodiments, the license string is generated using block ciphers. In still other embodiments the license string is generated using a symmetric stream cipher such as RC2, RC3, RC4, or RC5. In one particularly preferred embodiment, the license string is generated using the MD5 message digest algorithm, which takes a message of arbitrary length as input and produces a 128-bit output.

In one particular embodiment, the license string is generated in the following manner. A data structure is generated containing the current time, the type of license to be generated, the number of users to be authorized by the license, and a randomly generated number. Validation data is generated based on the created data structure and a secret key using the MD5 encryption algorithm is generated. The binary data representing the data structure and the validation data is encoded into a 24 character human readable string comprised of uppercase English characters (excluding capital "O" and capital "I") and the digits 2 through 9 inclusive. Encoding the binary data into the human readable string may be done in any reversible fashion. For example, the binary data can be viewed as a series of 8-bit ASCII character codes, resulting in an alphanumeric string generated by the binary data.

Once generated, the license string is transmitted to the requestor. As noted above, the license string may be transmitted via network means, by mail, by telephone, or in person. The product receives the license string input by the requestor (step 1308). The requestor may input the license string by typing the license string into an entry field provided by the product.

The product verifies the license string input by the requestor (step 1310) by, in some embodiments, verifying that the check sum is accurate. In other embodiments, the license string is verified by decrypting the encrypted string. Once the license string has been decrypted, the alphanumeric input string may be analyzed to determine if it is a valid string (step 1312). In some embodiments, this is accomplished by determining whether certain elements of the string fall within logical parameters, such as string generation date. For example, in this embodiment, if a string indicates that it was generated in a year before computers were invented, the string is likely invalid. In other embodiments, a checksum may be used in addition to an encryption technique. In these embodiments the string's validity is determined by ensuring that a valid check sum is produced. If the product determines that the string is invalid, then access is denied to the requestor (step 1314). Alternatively, if the license string is valid then the requestor is allowed access to the product (step 1316).

In one particular embodiment, the license string entered by a user is validated in the following manner. The human readable string entered by the user into the product is translated into its binary representation which consists of two parts: the license data and the validation data. As noted above, the binary data encoding is reversible and, therefore, the human readable character string can be used to recover the binary data string generated as described above. Using the example described above, if binary data is converted into a human readable string using ASCII character codes, then recovery of the binary data requires only that the conversion from character code to binary data be performed. The binary license data recovered from the human readable string is used to generate a new set of binary validation data for the license. The generated validation data is compared to the validation data encoded in the license string. If the generated validation data exactly matches the encoded validation data then the license is accepted as valid, that is, the license string has not be altered or otherwise subjected to tampering.

A license string may allow one or more users access to the product. For the systems described previously, license strings are entered into the product via a dialog box, and a license string allows users of a particular facility access to the product. Such a license will be referred to as a facility license. In one embodiment, the identity of particular authorized users is associated with a license string when it is entered, and only those particular users are granted access to the product. In other embodiments, the license string enables a predetermined number of users to access the product and any users are allowed access to the product provided that the total number of users does not exceed the predetermined number of authorized users.

In another implementation, an organization may provide multiple facilities for use by its members. In this embodiment, it is desirable to provide a license to the organization that allows members of the organization to use any facility. Such a license will be referred to as an enterprise license. An enterprise license is stored in a central repository that can be accessed by all facilities. In one embodiment, the enterprise license is stored on a separate server and all facilities access the licenses on that server. In other embodiments, a server that hosts a facility may also store the enterprise license. For embodiments in which particular users are identified by the enterprise license, each such user will appear in the authorized user list for each facility.

As an illustrative example, consider an enterprise having two facilities: Facility A and Facility B. If users I, J, and K are specifically authorized by the enterprise server, then users I, J, and K may access either Facility A or Facility B. Put another way, users I, J, and K appear on a list of authorized users stored by a main server, and Facility A and B access the main server to construct their local list of authorized users.

When, for example, user K attempts to access Facility B, Facility B first checks any local facility licenses to determine if K is an authorized user. If no facility licenses exist, or if K is not authorized by an existing facility license or licenses, Facility B checks for an enterprise license. If no enterprise license exists, or if an existing enterprise license or licenses does not authorize user K, then access to Facility B is denied user K.

Access to a facility may be controlled by one or more enterprise licenses, one or more facility licenses, or any combination of facility licenses and enterprise licenses. Each license has its own license string that must be entered into the product to allow access. In the example described above, a single enterprise license can authorize both a core set of users for all facilities as well as a number of local users for each facility. An enterprise server may, as described above, maintain a list of authorized users containing I, J, K. An enterprise license allowing five users access to the product allow I, J, and K to access any facility in the enterprise that is associated with the enterprise server maintaining the list of authorized users. A fourth user, user M, may desire to be added to the local authorized user list for one of the facilities. Before the facility adds user M to it's local list of authorized users, it determines if the number of users in its authorized user list after adding M exceeds the number of users authorized by any local facility license plus any enterprise license. If not, then user M is added.

In some embodiments, the product may be fully functional when distributed. In these embodiments, the product may be configured to disable itself within a predetermined period of time unless a valid license string is entered. Data entered by users while the product was in its "trial" period may be made read-only, in order to preserve user work product. In certain of these embodiments, license strings may be generated that extend the "trial" period by a predetermined amount of time.

While the invention has been particularly shown and described with reference to specific preferred embodiments, it should be understood by those skilled in the art that various changes in form and detail may be made without departing from the spirit and scope of the invention as defined by the appended claims.

What is claimed is:

1. A method for controlling access to a product, the method comprising the steps of:
   (a) receiving a request for a product;
   (b) generating, substantially at the time the request is received, a license string that controls access to the product, the license string being formed using a cryptographic process to encode a date of creation of the license string, a number of users enabled by the license string, and a type associated with the license string; and
   (c) transmitting the license string to a requestor of the product.

2. The method of claim 1 wherein step (a) comprises receiving the request via a distributed communications network.

3. The method of claim 1 wherein step (a) comprises receiving payment information from the requestor.

4. The method of claim 3 further comprising the step of verifying the received payment information.

5. The method of claim 1 wherein the cryptographic process encodes a character text string and wherein the license string controls access to the product when supplied by the requestor.

6. The method of claim 1 wherein the cryptographic process encodes the license string as an upper case alphanumeric string, the alphanumeric string excluding capital O, capital I, and numbers 0 and 1, and wherein the license string controls access to the product when supplied by the requestor.

7. The method of claim 1 wherein step (b) comprises including validation information in the generated license string.

8. The method of claim 1 wherein the license string controls access to a single facility.

9. The method of claim 1 wherein the license string controls access to multiple facilities.

10. The method of claim 1 wherein step (c) comprises transmitting the license string to the requestor via a distributed communications network.

11. The method of claim 1 wherein the product functions for only a predetermined period of time if the license string is not entered into the product.

12. The method of claim 1 wherein the license string enables the product to function beyond a predetermined period of time.

13. A system for controlling access to a product, the system comprising:
   an input unit receiving a request for a product;
   a license string generator in electrical communication with said input unit, said license string generator producing, substantially at the time a request is received, a license string that controls access to said product, said license string being formed using a cryptographic process to encode a date of creation of said license string, a number of users enabled by said license string, and a type associated with said license string; and
   an output unit transmitting said license string to a requestor of said product.

14. The system of claim 13 wherein said input unit is in electrical communication with a network and said input unit receives said request for said product via said network.

15. The system of claim 13 wherein said license string controls access to a single facility.

16. The system of claim 13 wherein said license string controls access to multiple facilities.

17. The system of claim 13 wherein said output unit is in electrical communication with a network and said output unit transmits said product and said license string to said requestor via said network.

18. An article of manufacture having computer-readable program means embodied thereon, the computer-readable program means comprising the system of claim 13.

19. An article of manufacture having computer-readable program means for electronically distributing a product, the computer-readable program means comprising:
   computer-readable program means for receiving a request for a product;

computer-readable program means for generating a license string that enables the product, the license string being formed using a cryptographic process to encode a date of creation of the license string, a number of users enabled by the license string, and a type associated with the license string;

computer-readable program means for associating the license string with the product; and computer-readable program means for transmitting the product and the associated license string to a requestor of the product.

20. The article of manufacture of claim 19 further comprising computer-readable program means for receiving payment information from the requestor.

* * * * *